July 15, 1958

A. W. NICKELSON 2,842,827

BLOCK FORMING MACHINE

Filed Jan. 14, 1955

INVENTOR

ALISON W. NICKELSON

BY Lee L. Townshend

ATTORNEY

July 15, 1958

A. W. NICKELSON 2,842,827

BLOCK FORMING MACHINE

Filed Jan. 14, 1955

INVENTOR
ALISON W. NICKELSON
BY Lee L. Townshend
ATTORNEY

United States Patent Office 2,842,827
Patented July 15, 1958

2,842,827

BLOCK FORMING MACHINE

Alison W. Nickelson, Petersburg, Va., assignor to The Richmond Foundry & Mfg. Co., Inc., Richmond, Va., a corporation of Virginia Application January 14, 1955, Serial No. 481,875

1 Claim. (Cl. 25—103)

The present invention relates to the art of plastic block and earthenware apparatus and this application is a continuation-in-part of my prior application Serial No. 200,986 filed December 15, 1950, now abandoned, on a Block Forming Machine.

As in my said prior application, the apparatus herein disclosed is a machine for making cinder blocks, concrete blocks, tiles, and similar structural elements for building purposes.

At the present time, virtually all commercial machines for molding building blocks employ a hopper from which material is fed by gravity into a feed drawer wherein it is transported over the open top of a mold box and dumped therein to fill the same. The feed drawer is then withdrawn to receive a new charge from the hopper supply and the material in the mold box is subjected to vibration and compression, after which the mold box is stripped from the formed block which then is removed from the machine. The cycle is repeated continuously during operation of the machine.

The present invention is designed to provide an improved machine of the general nature above described which is capable of faster and more efficient operation than known machines of the prior art, having a substantially increased output capacity and decreased operating cost, made possible by novel structural features, organization, and mode of operation as hereinafter disclosed.

Another object of the invention is to provide a novel feed drawer and means for agitating its contents during discharge to the mold box.

Many other and incidental objects will be apparent from the following description taken in conjunction with the accompanying drawings, in which:

Figure 15 is a wiring diagram of the circuits for the machine controls.

Figure 6:
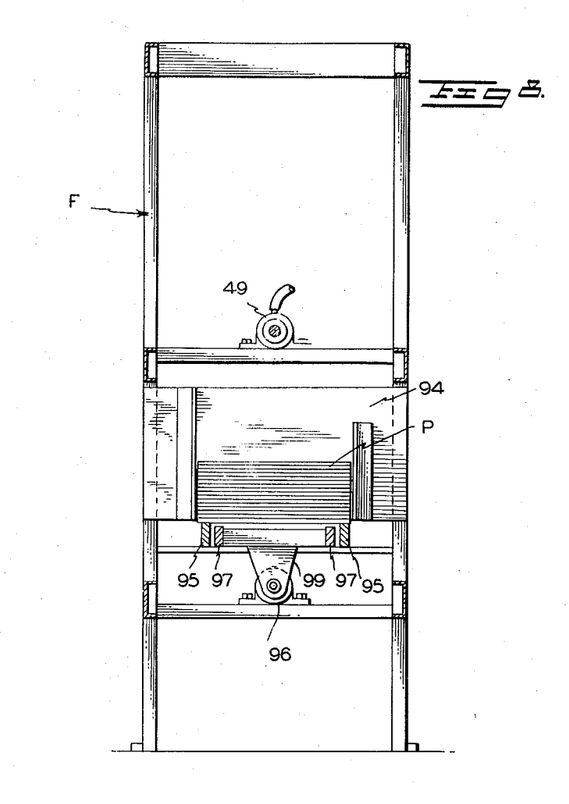
Figure 6 is an enlarged sectional view substantially on line 6—6 of Fig. 5.

In the specific form of the invention as herein disclosed the machine includes a material supply source such as a gravity discharge hopper 20 suitably supported in a generally designated main frame F above a reciprocable feed drawer 21. The hopper opens at its bottom through a rectangular mouth 22 into the open top of the feed drawer when the drawer is in retracted position, as in Fig. 3. A cut off plate 23 carried by the feed drawer extends rearwardly from its top to slide beneath and close the hopper mouth when the drawer goes forward and until it returns to its retracted position. Wiper strips 24 of rubber or the like are carried by and surround the hopper mouth in bearing engagement on the cut off plate and the flush top edge of the feed drawer to retain the hopper material against spillage. The bottom of the feed drawer is open for free discharge of its contents into the subjacent open top of the mold box 25 at the front end of the machine as the drawer moves forwardly thereover, as best shown in Fig. 6. A plate 26 rigidly mounted on fixed elements of the main frame provides a bottom for the feed drawer when it is not positioned over the mold box. Other wiper strips 24 are carried by and surround the bottom edge of the feed drawer in contact with the top edge of the mold box and with the plate 26 to prevent spillage of material. Additionally, the forward feed drawer wiper strip acts to sweep across and level off the surface of the material in the mold box as the feed drawer travels back.

Figure 11:
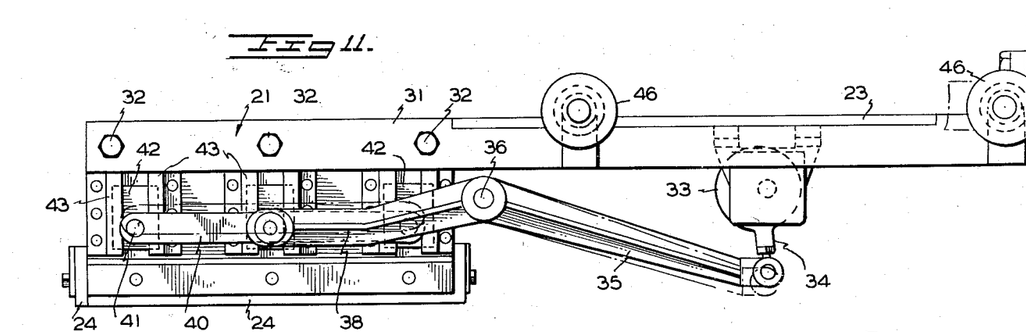
Figure 11 is a detail side elevation of the mold feed drawer employed.
Figure 12:
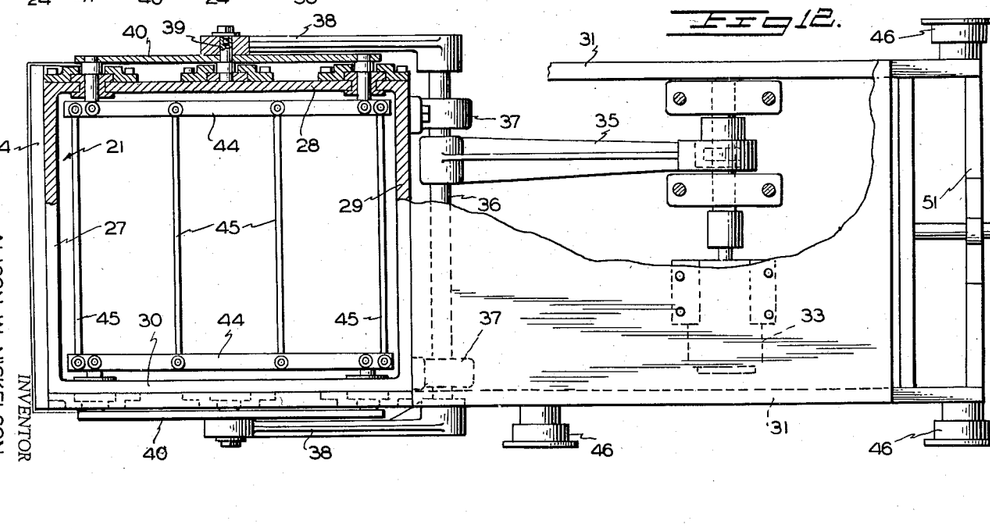
Figure 12 is a top plan view of the feed drawer, partly in section and partly broken away.

The feed drawer assembly, best seen in Figs. 6, 11 and 12, comprises the drawer 21 open at top and bottom and encompassed by four side walls 27, 28, 29 and 30 constituting a rectangle; a pair of guide members 31, each of which is rigidly secured by appropriate attaching elements 32 to the outer top edge portion of the adjacent side wall, extending in parallel spaced relation in rear of the drawer and transversely connected by the hopper cut off plate 23; and a basket-like agitator driven from an electric motor 33 mounted on and depending from the under face of the cut off plate 23. An eccentric crank 34 on the motor shaft has pivotal connection with the rear end of an arm 35 which is fixedly connected at its forward end to a rock shaft 36 disposed transversely beneath the guides 31 and which is journalled in bearings 37 carried by the rear wall 29 of the feeder drawer; so that the arm 35 is caused to oscillate in a vertical plane and correspondingly to rock the shaft 36 during operation of the motor.

Rock shaft 36 extends at each end slightly outwardly of the plane of the adjacent side wall of the feeder drawer and has fixed thereon an arm 38 that extends forwardly alongside the feeder drawer and which has at its forward end a pivotal connection 39 with the mid section of a floating link 40. Each link 40 is disposed horizontally alongside its adjacent feeder drawer wall for a distance somewhat less than the distance between the front and rear walls of the drawer and carries a pin 41 at each end, which pin is passed laterally inwardly through the adjacent feeder drawer wall with a fixed mounting in a slidable closure plate 42. The side walls of the feeder drawer are vertically slotted to receive and accommodate the play of the pins 41 incident to vertical reciprocation of the links 40 and the closure plates are of sufficient area to cover the wall slots at all times. Each closure plate is slidable in vertical guides 43 fixed externally on the adjacent drawer wall. Links 40 and their corresponding pins 41 normally occupy a common horizontal plane slightly below the horizontal median of the feed drawer. The inner ends of the pins are fixedly attached to and support a vibrator basket comprised of side bars 44 secured to the pins and mutually connected by a series of widely spaced parallel rods 45 of bolt stock or the like which extend transversely between their side bars 44. These rods 45 are U-shaped and depend from the side bars with their long shallow bights occupying a common horizontal plane substantially at the bottom of the feed drawer when in their lowermost position.

The entire feed drawer assembly travels on rollers 46 carried by the guide bars 31, which rollers are engaged between upper and lower track rails 47 and 48 appropriately mounted in the main frame of the machine. Reciprocation of the assembly is effected by a fluid pressure motor comprising, in this instance, a hydraulic pressure cylinder 49 having a double acting piston with its rod 50 connected to a cross bar 51 secured to the rear ends of the guide members 31.

Vibrating mold and presser

Figure 4:
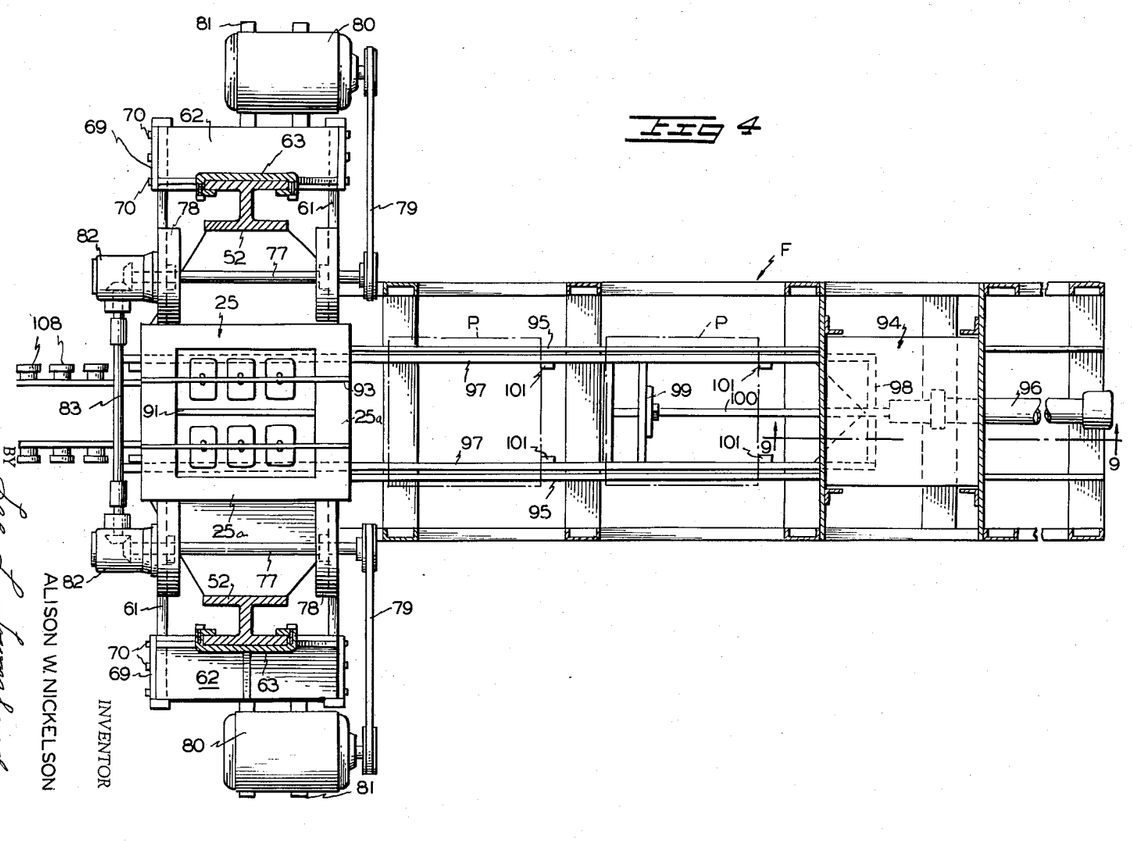
Figure 4 is a horizontal sectional view substantially on line 4—4 of Fig. 3.
Figure 5:
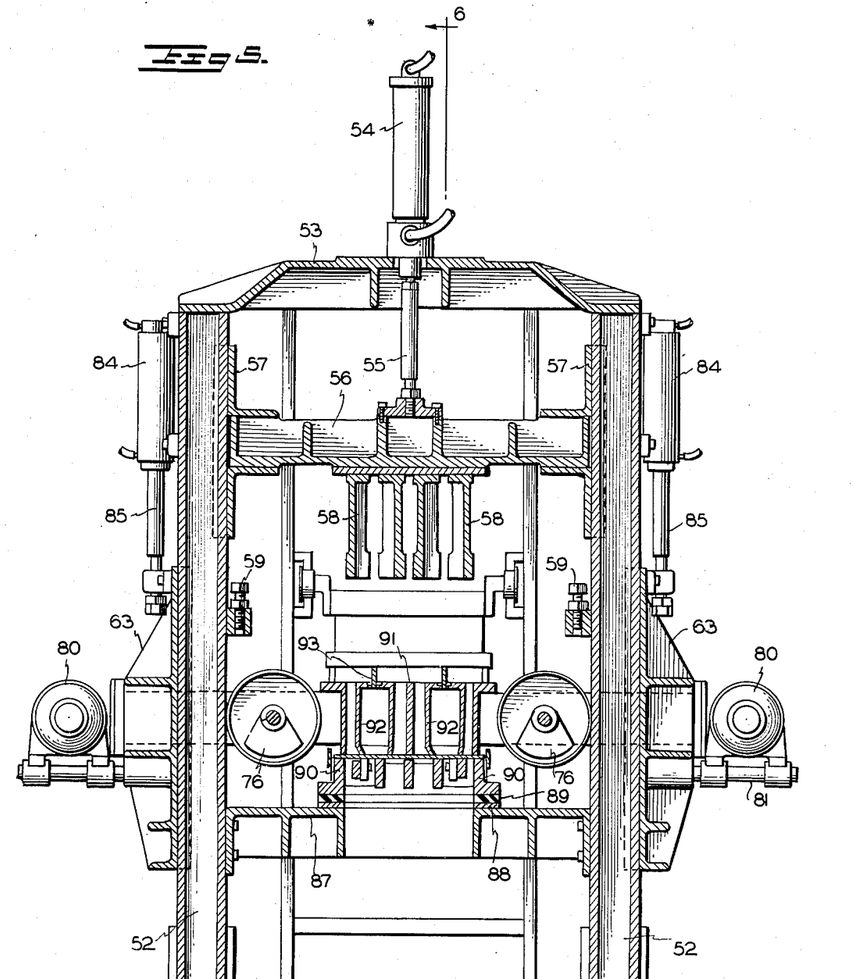
Figure 5 is a vertical sectional view substantially on line 5—5 of Fig. 3.

The forward section of the main frame F of the machine abuts a secondary frame which mounts the mold box 25 and associated mechanism for vibrating the box, compressing material in the mold box, and stripping the box from the formed blocks. This secondary frame comprises essentially a pair of heavy broadly flanged I-beams 52 arranged vertically in parallel relation and, as shown in Fig. 4, spaced apart a distance greater than the distance between the sides of the main frame. The tops of these beams are connected by a transverse inverted channel beam 53 which mounts vertically a double acting fluid pressure motor 54 of the cylinder and piston type, in which the rod 55 of the piston reciprocates through the beam 53 and is connected at its lower end to a press cross head 56. Guide shoes 57 on the ends of the cross head slide on the opposed inner flanges of the beams 52. A desired number of presser feet 58 are carried by and depend from the presser head 56 which together with the feet has a weight of 600 lbs. The motor 54 applies a force of 1,800 lbs. p. s. i. Vertically adjustable stops 59 on the beams 52 provide abutments in the descending path of travel of the shoes 57 to define the lower travel limit of the press.

Figures 13, 14:
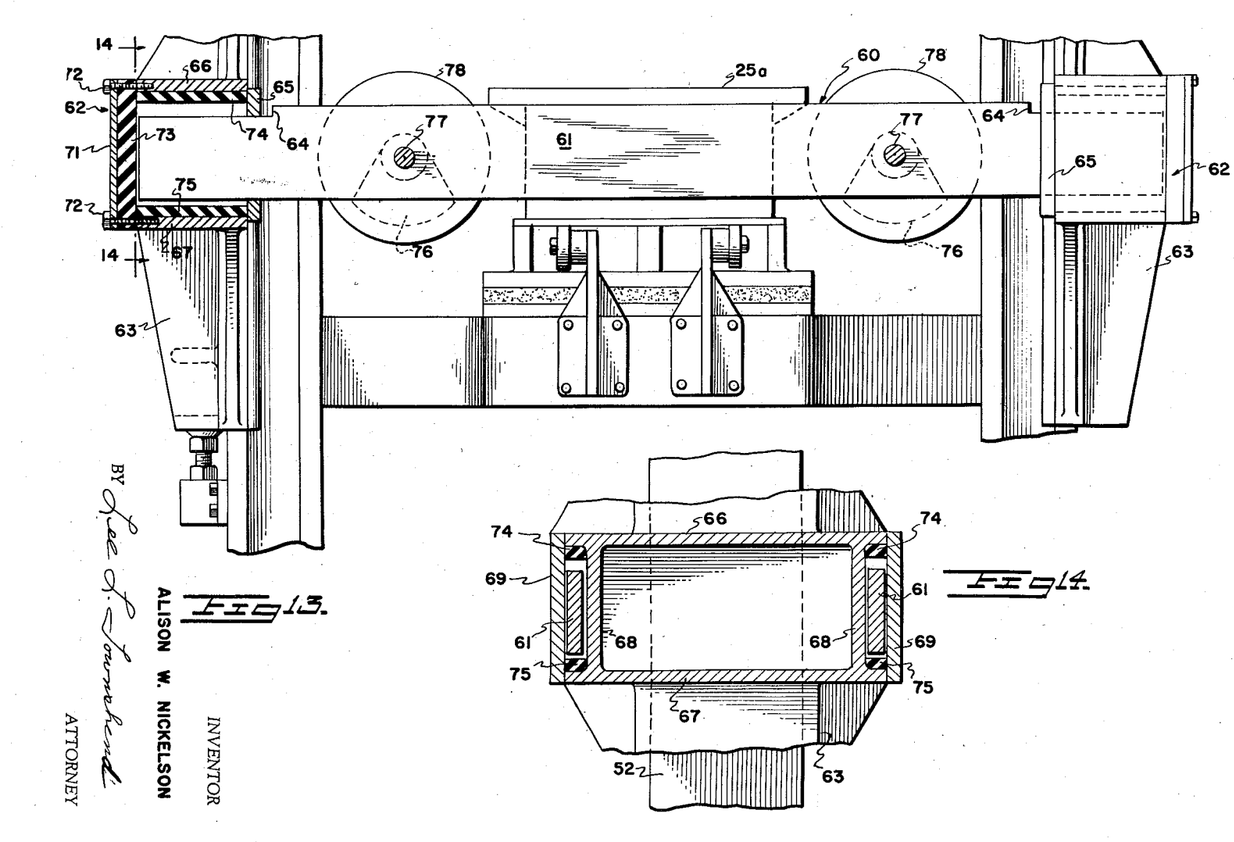
Figure 13 is a fragmentary front elevation, partly in section, of the vibratory mold box frame and its mounting.
Figure 14 is a sectional view on line 14—14 of Fig. 13.
Figure 19:
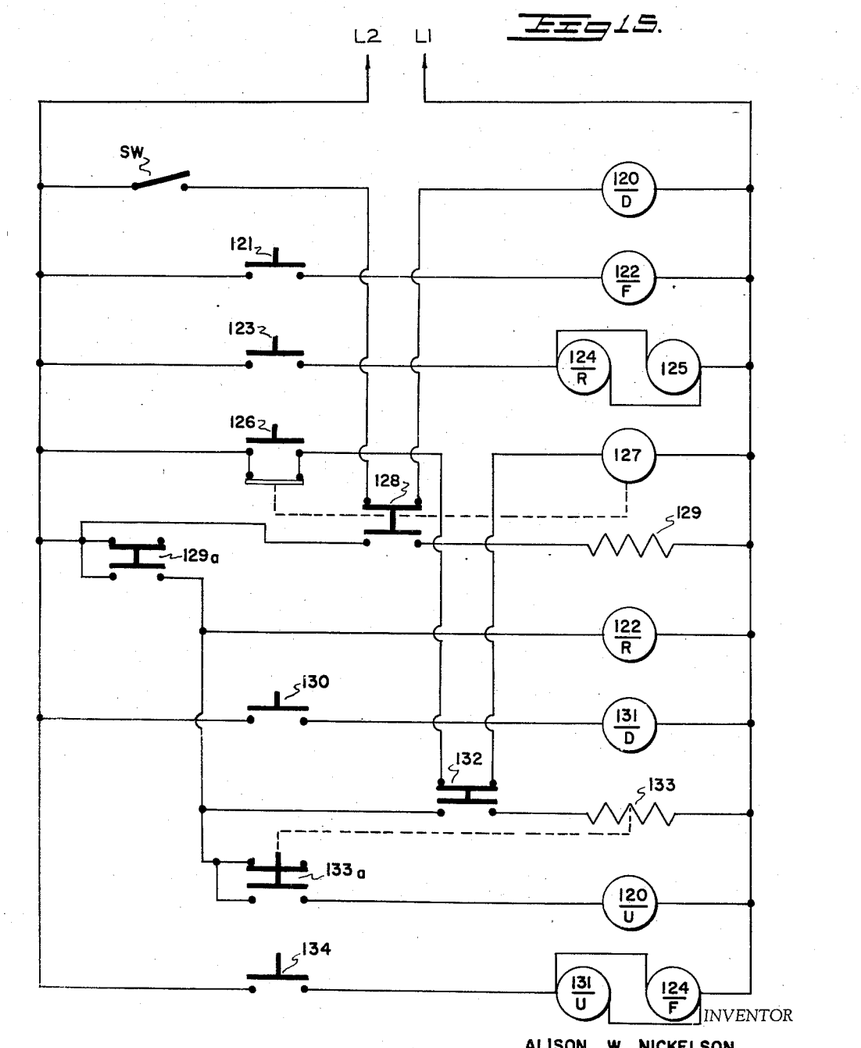

The top of the mold box 25 is flat and relatively wide, thus providing a supporting flange 25a which seats on the upper edges of the side pieces of a vibratory horizontal cradle designated generally as 60 and comprised of the parallel side pieces 61 which extend transversely with respect to and beyond the secondary frame uprights 52 into cushion mountings 62. These cushion mountings 62 support and transversely connect the ends of the side pieces 61 and are carried by guide shoes 63 slidable on the outer flanges of the beams 52. As shown best in Figs. 13 and 14, each end portion of the side pieces 61 is reduced at its upper edge to provide a shoulder 64 disposed inwardly relative to a collar 65 slidably fitted over the reduced end which is loosely received in a chamber provided in the adjacent cushion mounting 62. Integral web flanges on the central portion of each guide shoe 63 constitute a top 66, bottom 67, and inner side wall 68 for the chamber. The outer wall 69 is a cover plate secured to the flanges 66 and 67 by attaching elements 70. An outer end cover plate 71 also is secured to the flanges 66 and 67 by attaching bolts 72 which serve additionally to mount a thick rubber pad 73 on the inner face of the cover. Similar pads 74 and 75 are mounted on the inner faces of the top and bottom walls, respectively. The ends of the cradle side pieces 61 housed within the cushion mountings 62 are loosely received therein for limited freedom of movement both vertically and horizontally under vibrations imparted by eccentric weights 76 fixed on parallel rotary shafts 77 journalled in the side pieces 61. The weights are encompassed by guards 78 carried by the side pieces.

The shafts 77 project at their ends forwardly and rearwardly of the side pieces 61 and each is driven by a belt and pulley drive 79 from an electric motor 80 mounted on supporting bracket means 81 carried by the adjacent slide shoe 63. The two shafts are operatively connected at their front ends by an equalizing transmission gearing including transmissions 82 and the shaft 83.

Each vibrator motor has a rating of 2 H. P. and the four eccentric vibrator weights 76 are 5 lbs. each. This combination imparts to the vibratory cradle frame 60 and in consequence to the mold box a vibration frequency of 4,400 inpulses per minute.

The cradle frame 60 and associated vibrator motors 80 are supported entirely by the slide shoes 63 which are reciprocated vertically on the beams 52 by a pair of double acting fluid pressure motors 84 of the cylinder and piston types. Each motor cylinder is mounted vertically on the upper end portion of the outer flange of its supporting beam 52 and its piston rod 85 is connected to the top of the associated slide shoe 63. Vertically adjustable stops 86 carried by the outer flanges of the beams 52 provide abutments in the path of descending travel of the shoes 63 which determine the lower limit position of the shoes and the cradle 60.

Beneath the lower limit zone of the mold box supporting cradle 60 the beams 52 are connected by a transverse platform 87 that provides a base for a mold box bottom support comprising a bed plate 88 seated on the platform, a thick rubber pad 89 seated on the bed plate, and a pair of track rails 90 seated on top of the rubber pad. The track rails extend in parallel relation from front to rear of the platform and are spaced apart to accommodate between them the forward elements of pallet conveyor mechanism to be described. The rails 90 receive and support the marginal side portions of a pallet P which provides a bottom on which the mold box 25 sits when in fully lowered position. In the embodiment of the invention here shown the mold box is divided by a central partition 91 for the formation of two blocks. A requisite number of cores 92 are suspended within the box on either side of the partition from core holder rods 93 seated at their ends on the wide flat top 25a of the mold box. It is to be understood that the number and disposition of the presser feet 58 complements the number and disposition of the cores 92 for any selected type or form of block to be made.

Pallet feed mechanism

A pallet magazine 94 supported in the main frame of the machine rearwardly of the hopper and feed drawer holds a stack of pallets P which are dispensed successively onto a forwardly extending track consisting of a pair of rails 95 suitably supported in the machine framework in registry with the pallet rails 90 beneath the mold box at the front of the machine. At intervals determined by automatic controls later described a reciprocating impeller powered by a double acting fluid pressure motor 96 of the cylinder and piston type moves the lowermost pallet of the stack from the magazine onto the track rails 95 and advances it, as well as following pallets, forwardly along the track in a step by step movement until it is discharged from the machine bearing a formed block.

Figure 7:
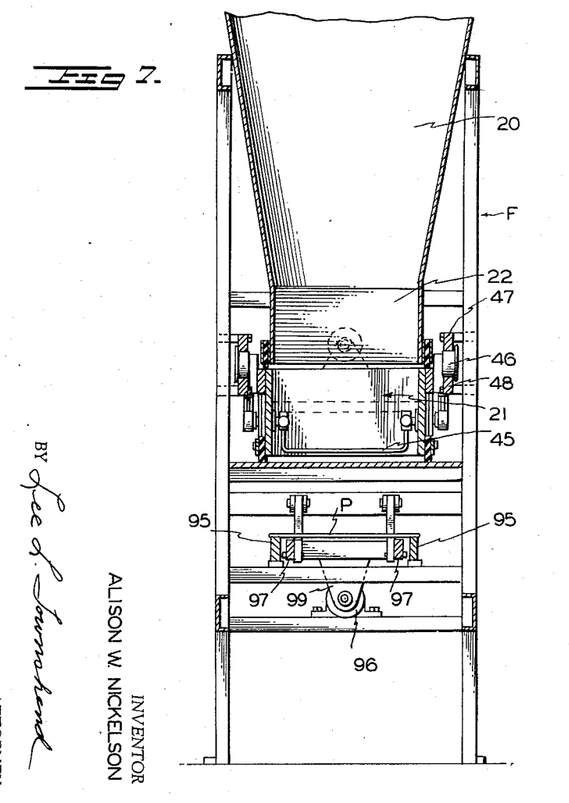
Figure 7 is a sectional view substantially on line 7—7 of Fig. 1.
Figure 8:
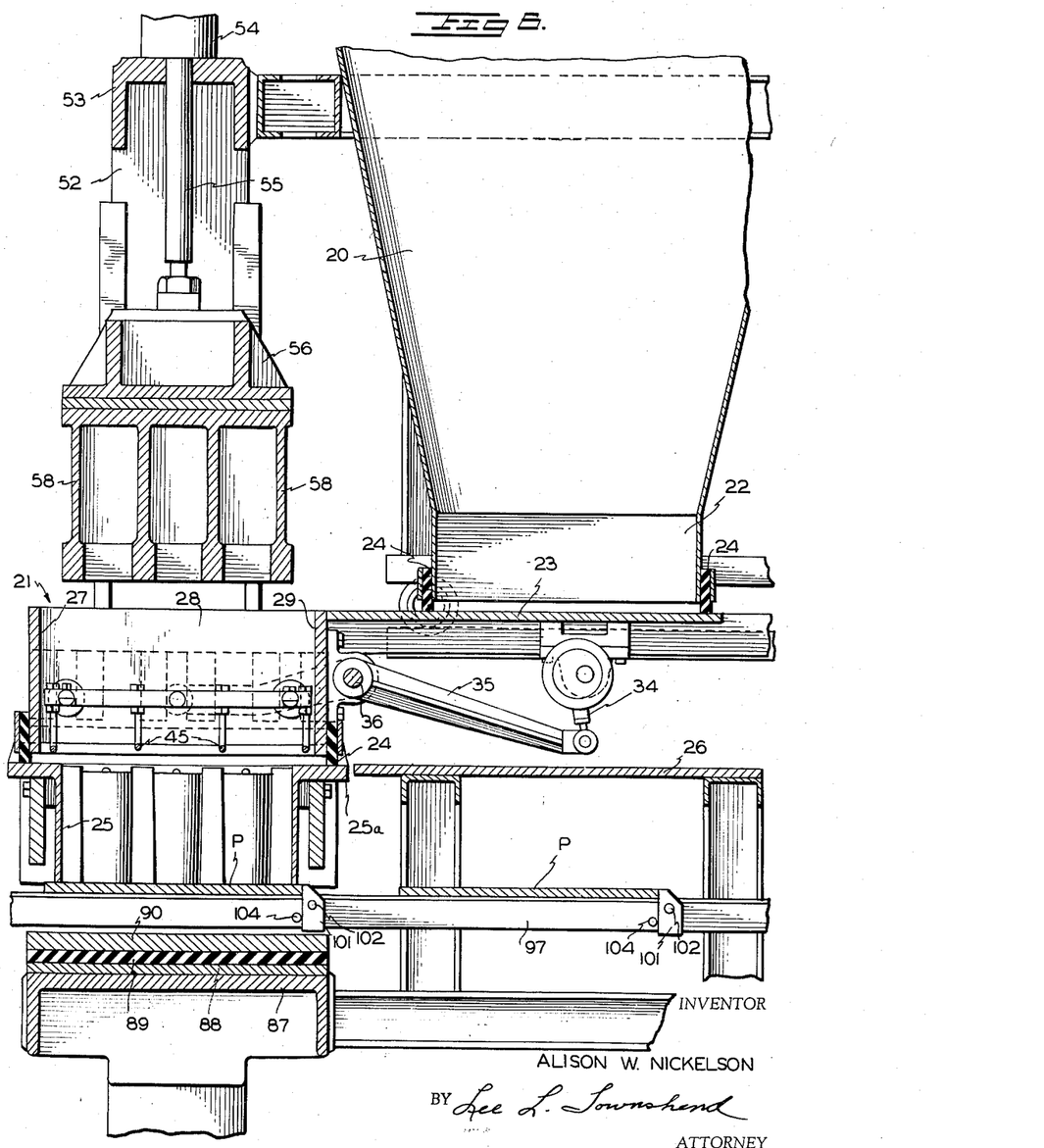
Figure 8 is a sectional view substantially on line 8—8 of Fig. 1.

The impeller comprises a light openwork frame made of side bars 97 extending horizontally between and parallel to the pallet track rails 95 and conneced at their rear ends by an end bar 98. The front end of the frame is open so that its side bars may be unobstructed when the impeller moves forward in its protractile stroke. As best seen in Figs. 7 and 8, the width of the impeller frame is less than the width of the pallet track and, although the impeller reciprocates in the horizontal plane of the track, the top edges of the side bars 97 are at all times slightly below the flat top faces of the pallet track rails 95 so that the impeller frame bears no part of the weight of the pallets. A brace strut 99 extends tranversely between and rigidly connects the impeller side bars 97 and has a depending central portion that is bolted or otherwise positively connected to the end of the piston rod 100 of the motor 96, whereby the double acting piston of the motor correspondingly actuates the impeller.

Figure 1:
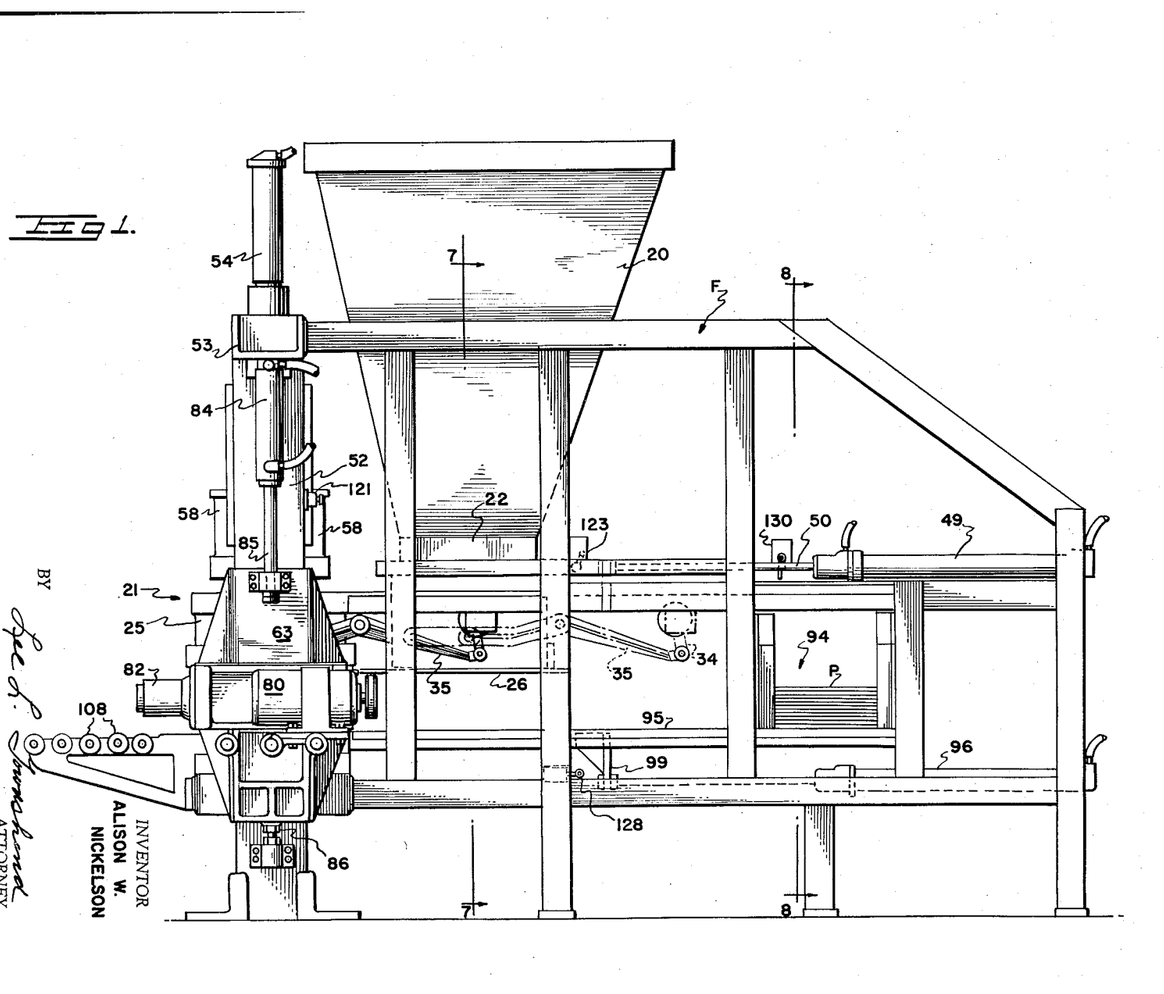
Figure 1 is a side elevation of the machine of the present invention.
Figure 2:
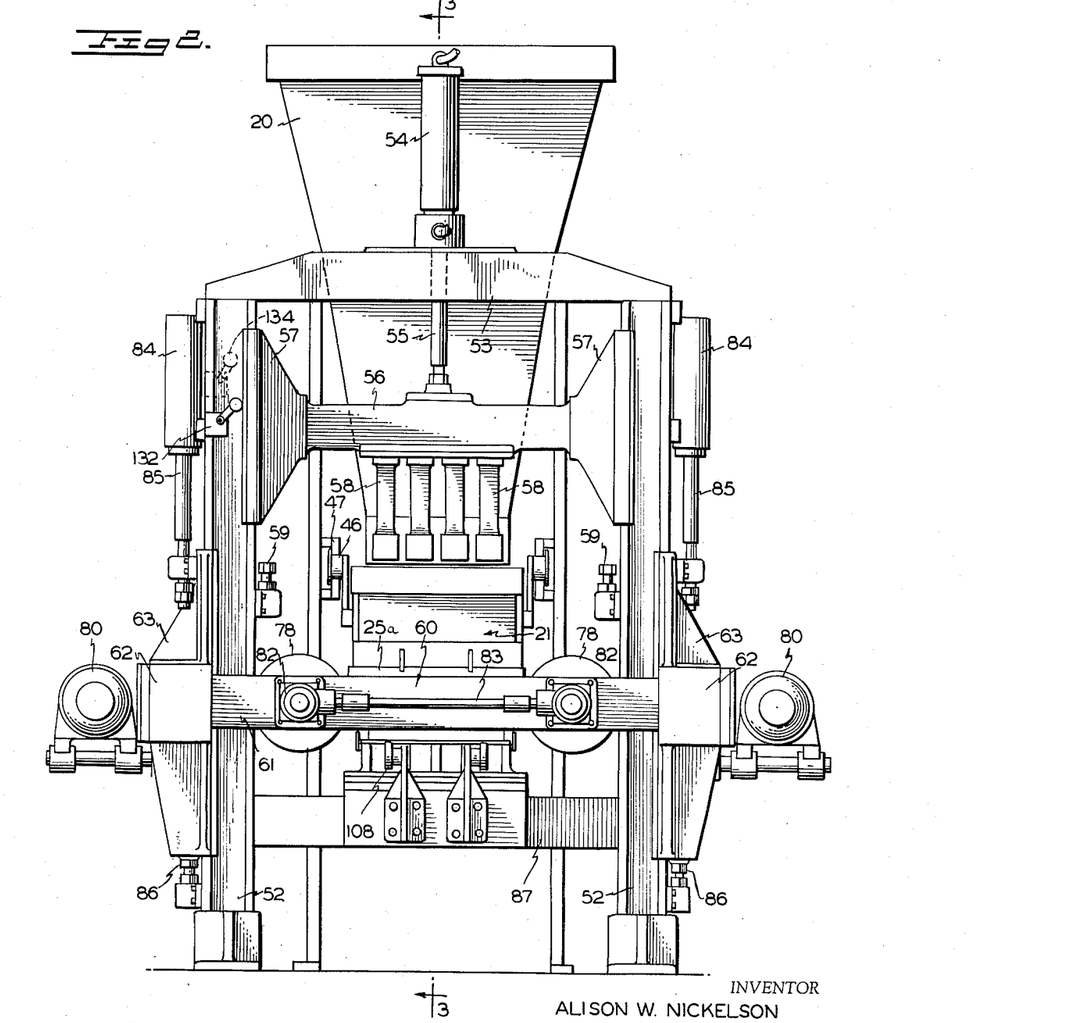
Figure 2 is a front elevation thereof.
Figure 3:
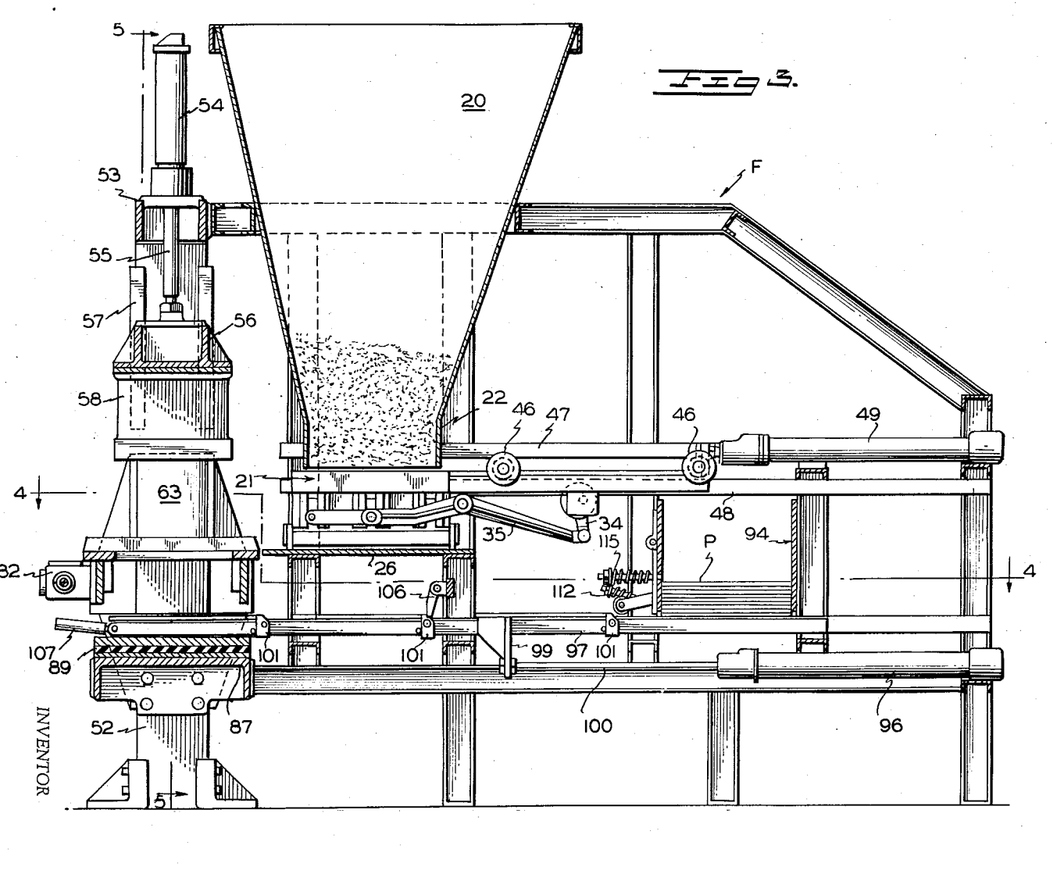
Figure 3 is a vertical sectional view taken substantially on line 3—3 of Fig. 2.
Figure 9:
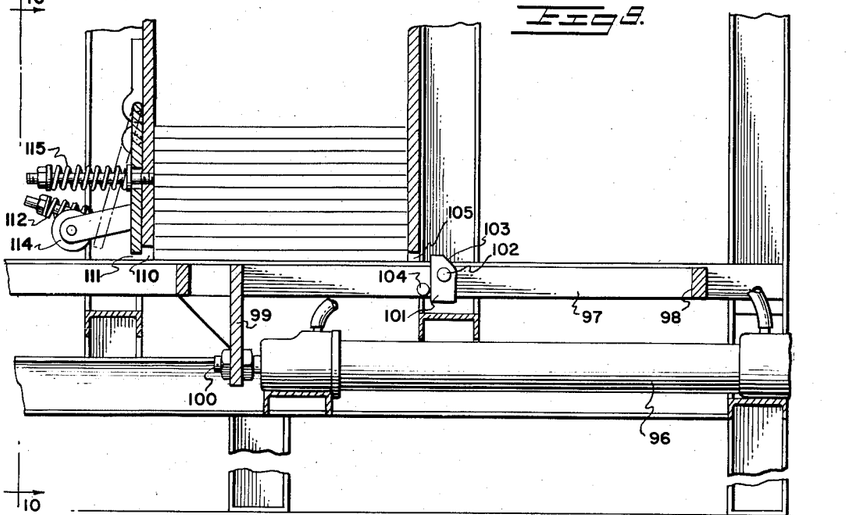
Figure 9 is a sectional view substantially on line 9—9 of Fig. 4.

When the impeller is in fully retracted position at the rearmost limit of its travel, as in Fig. 9, a gravity biased dog 101 pivoted on the inner face of each side bar 97 on a stud 102 hangs vertically just in rear of the pallet magazine with its nose protruding above the adjacent pallet track rail to a height corresponding to the thickness of a pallet. The dog has a leading straight front edge and a bevel 103 at its rear or trailing top corner. A stop pin 104 carried by the side bar 97 engages the leading front edge of the dog at a point below its pivotal axis, so that the dog is prevented from swinging clockwise from its vertical position but is free to swing counterclockwise. Upon forward movement of the impeller the upstanding nose of the dog rides through a vertical slot 105 in the rear wall of the magazine into engagement with the trailing edge of the lowermost pallet and pushes it forwardly out of the magazine where it slides along the track rails 95 into an advanced position as seen in Fig. 3. The piston stroke of the motor 96 is such that three protractile strokes are required to advance the pallet to its block receiving position beneath the mold box. Also as shown best in Fig. 3, similar pairs of the dogs 101 are mounted along the impeller side bars 97 at proper intervals to effect a step by step advance of pallets forwardly along the pallet track during each protractile stroke of the impeller. A gravity biased detent 106 mounted on an element of the machine frame operates to restrain the pallets against retrogression. It will be apparent that upon each retractile stroke of the impeller the bevels 103 of the dogs will slide beneath the leading edges of the following pallets and cam the dogs to swing counterclockwise out of the path of travel of the pallets. The front end of each of the impeller side bars 97 mounts a spring buffer means 107 which functions to engage the rear edge of a pallet on which a block has been formed so as to cushion the force of the impeller in ejecting the pallet onto the discharge conveyor rollers 108 at the front of the machine.

Figure 10:
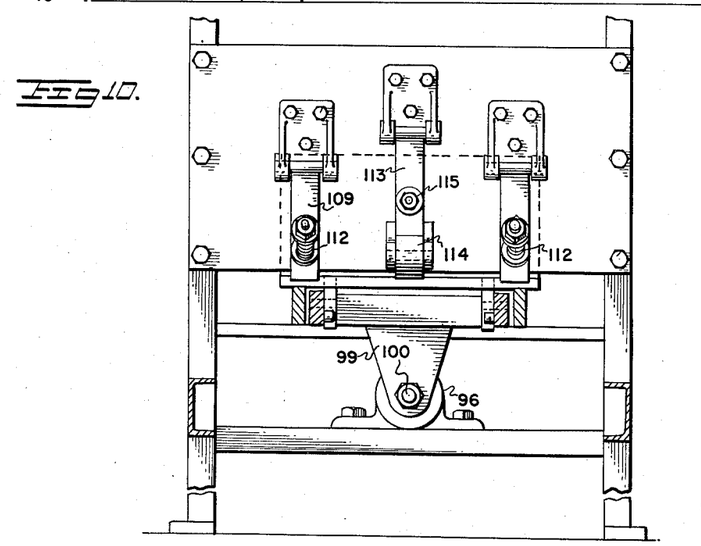
Figure 10 is a sectional view on line 10—10 of Fig. 9.

Pallets of the type commonly employed in block forming machines are not always of uniform thickness; usually some in a stack will be thinner than the others. This variance has proved troublesome. The present invention incorporates means operative automatically to prevent the delivery of more than one pallet at a time from the magazine regardless of variations in thickness. This means is best shown in Figs. 9 and 10 and comprises a pair of gate members 109 hinged on the outer face of the front wall of the magazine to swing in a vertical arc. The magazine front wall has a bottom edge opening delivery slot 110 of a height designed to permit egress of a single pallet of the ordinary thickness used, so that only one such pallet may be dispensed during each protractile stroke of the impeller. The gate members 109 extend downwardly below the top of the slot 110 and partially cover the same. The lower ends of the gate members, when the members lie flat against the magazine wall, are spaced only far enough above the pallet track to pass only the thinnest pallet likely to be encountered in a stack, leading a reduced height egress slot 111 ahead of the slot 110. Spring biasing means 112 normally holds the gates 109 strongly and flatly against the front wall of the magazine. When a pallet is pushed from the magazine if it is thicker than the height of the gate slot 111 its leading edge engages the gates and swings them outwardly so that they ride up on the pallet and snap back into place when the advancing pallet is past. If a pallet is so thin that it can pass freely through the slot 111 the gates will hold back any other pallet so that, regardless of pallet thickness, only one at a time can be dispensed from the magazine. The gate members 109 are spaced at either side of a central hold down arm 113 similarly hinged on the magazine front and mounting at its lower end a roller 114 which bears down on the platens under the urge of spring biasing means 115.

*Operation*

In the herein disclosed preferred embodiment of the present invention the various double acting motors 49, 54, 84 and 96 are actuated by hydraulic pressure although they may, if desired, be pneumatic. The hydraulic system, not shown in detail, is conventional as to fluid lines, valves, etc. No specific illustration is believed necessary. The various valves controlling flow of the motive fluid are solenoid operated valves of known construction, the solenoids of which are governed from an overall electrical operating circuit in accordance with the wiring diagram of Fig. 15.

Prior to operation the machine elements are in the following positions: The mold box 25 and its vibratory cradle frame are in full up position, and also the presser head 56; the feed drawer 21 is fully retracted beneath the hopper mouth and receives a charge of material therefrom; and the pallet impeller is in its extreme protracted position.

The machine is set into automatic cycling operation by manually closing a main switch Sw on a control panel, not shown. This establishes a 220 v. A. C. circuit from the leads L1 and L2 and energises the mold box control solenoid 120 so that the motors 84 are actuated to lower the entire assembly of the vibratory cradle frame 60 and mold box 25, so that the mold box comes to rest on a pallet P previously positioned to provide a closed bottom for the mold box. In descending, the cradle frame assembly trips limit switch 121 which closes to energise the feed drawer control solenoid 122 to actuate the feed drawer motor 49. The feed drawer then comes forward over the top of the mold box and empties its charge by gravity into the mold box. When the feed drawer reaches full forward position it trips limit switch 123 which closes to energise the pallet impeller control solenoid 124 and also to close the circuit for the starter 125 of the feed box agitator motor. This motor 33 is ½ H. P. with an output speed of 230 R. P. M. and vibrates the feed drawer basket agitator at 920 impulses per minute. The pallet impeller motor 96 is thus actuated to retract the impeller when the feed drawer agitator commences operation. Concurrently with switch 123 another limit switch 126 is closed to actuate the starter for the mold box vibrator motors 80. Retraction of the pallet impeller trips a limit switch 128 to deenergize the mold box solenoid 120 and close the operating circuit for an electric timer 129—129a which continues the mold box vibration and the feed drawer agitation for an interval that is predetermined by the setting of the timer.

When the timer 129—129a gives up the solenoid control 122/R operates to reverse the feed drawer motor 49 and to stop the feed drawer agitator motor. When the feed drawer goes back its mechanism trips a limit switch 130 that closes to operate a solenoid control 131/D which actuates the press motor 54 to force the presser feet 58 down upon the material in the mold box while it is still vibrating under the action of the motors 80 and the eccentric weights 76. At the same time that the press comes down it actuates a limit switch 132 which sets in operation an electric timer 133—133a to continue the action of motor 54 to force the presser feet down into the mold for an interval predetermined by the timer setting. Switch 132 also operates to cut out the mold box vibrator motors 80. When ates to cut out the mold box vibrator motors 80. When the timer 133—133a gives up the mold box control solenoid 120/U is operated to reverse the motors 84 whereby to elevate the cradle 60 and thus strip the mold box upwardly off the formed block. At the time switch 132 is actuated another limit switch 134 also is actuated by the press reaching its lower limit. This switch closes to operate the press control solenoid 131/U to reverse the motor 54 and raise the press to its full up position. At the same time it operates the pallet impeller control solenoid 124/F to actuate the impeller motor 96 and accomplish a protractile stroke of the impeller.

It is to be understood that the various limit switches are of a known type in which an actuator is spring biased to return automatically to its initial limit position after being released by the means employed to move it to an opposite limit position. Accordingly, the operation of the machine is automatic following return of the mold box to its up position so that the above described cycle repeats automatically while the main switch Sw remains closed.

The timer settings are necessarily changed to suit the consistency of the material from which the blocks are made. Consequently the speed of the machine varies with the type of blocks being made, from 6 cycles per minute to 3 cycles per minute. The machine is capable of delivering 700 to 800 eight by eight inch cinder blocks per hour.

A highly important feature of the present invention is the tamping action of the feed drawer agitator basket upon the material as it is dropped into the mold box. Due to the fact that the agitator reciprocates vertically in the feed drawer at a rapid rate, the basket rods not only serve to break up the material in the drawer but they function also as tampers, so that this invention provides a method and means for tamping the material in the mold box while the feed drawer is over the mold.

Although the present invention has been described in conjunction with a preferred embodiment, it is to be understood that modifications and variations may be resorted to without departing from the spirit and scope of the invention. Such modifications and variations are considered to be within the purview and scope of the invention as claimed.

I claim:

A horizontally reciprocable material feed drawer for block molding machines, comprising, front, rear, and side walls in rectangular configuration with their top and bottom edges occupying parallel planes, the drawer being open at the top and bottom, a rock shaft journalled on the rear wall exterior and projecting at each end outwardly from the plane of the adjacent side wall, an arm fixed on each end of said shaft and extending forwardly alongside the drawer with its front end in pivotal connection with a floating link disposed horizontally alongside the adjacent drawer side wall, the side walls having vertical slots therein in transverse alignment adjacent the ends of said links, a closure plate for and covering each slot at all times and vertically slidable on the adjacent drawer wall exterior, a pin fixedly secured to each plate and extending freely through the adjacent wall slot into the drawer, an openwork basket in the drawer comprised of horizontal side bars secured to the inner ends of said pins and mutually connected by a series of spaced parallel transverse rods, the major portions of said rods occupying a common horizontal plane below the horizontal median plane of the drawer, and means movable with the drawer to rock said shaft whereby to effect vertical linear reciprocation of said basket within the drawer.

References Cited in the file of this patent

UNITED STATES PATENTS

| Number | Name | Date |
|---|---|---|
| 930,053 | Diefendorf | Aug. 3, 1909 |
| 1,590,053 | Nowak | June 22, 1926 |
| 1,695,327 | Goldston | Dec. 18, 1928 |
| 2,029,365 | Gelbman | Feb. 4, 1936 |
| 2,308,132 | Wellnitz | Jan. 16, 1942 |
| 2,341,012 | Billman et al. | Feb. 8, 1944 |
| 2,492,297 | Lagarde | Dec. 27, 1949 |
| 2,519,994 | Beyersdorfer | Aug. 22, 1950 |
| 2,586,210 | Corwin | Feb. 19, 1952 |
| 2,652,613 | Warren | Sept. 22, 1953 |
| 2,676,382 | Praschak | Apr. 27, 1954 |
| 2,685,116 | Schutt | Aug. 3, 1954 |
| 2,692,418 | Besser | Oct. 26, 1954 |
| 2,713,709 | Wright | July 26, 1955 |